United States Patent [19]

Hansen

[11] 3,850,415
[45] Nov. 26, 1974

[54] SCREW EXTRUDER FOR SYNTHETIC PLASTICS MATERIAL
[76] Inventor: Gerhard Hansen, Heerberg 87, D 7161 Laufen am Kocher, Germany
[22] Filed: Mar. 12, 1973
[21] Appl. No.: 340,058

[30] Foreign Application Priority Data
Mar. 25, 1972 Germany............................ 2214715

[52] U.S. Cl. ............................................... 259/191
[51] Int. Cl. ............................................. A21c 1/06
[58] Field of Search ......... 259/191, 192, 193, 9, 10, 259/25, 26, 45, 46, 109, 110

[56] References Cited
UNITED STATES PATENTS

| | | | |
|---|---|---|---|
| 3,228,065 | 1/1966 | Cournoyer | 259/191 |
| 3,300,811 | 1/1967 | Berger | 259/192 |
| 3,375,549 | 4/1968 | Geyer | 259/192 |
| 3,431,599 | 3/1969 | Fogelberg | 259/191 |

*Primary Examiner*—Robert W. Jenkins
*Attorney, Agent, or Firm*—Roylance, Abrams, Berdo & Kaul

[57] ABSTRACT

A screw extruder comprises a body defining a bore in which a screw is mounted for rotation and a filling aperture through which synthetic plastics material is fed into the bore. The section of the bore adjacent the filling aperture is of greater gross sectional area than the remainder of the bore to allow a greater quantity of material to be fed into the housing than would otherwise be the case thus enabling a greater output to be achieved.

8 Claims, 5 Drawing Figures

SCREW EXTRUDER FOR SYNTHETIC PLASTICS MATERIAL

The present invention relates to a screw extruder for plastics with a screw in a housing, having a filling opening in its filling section.

Attempts have been made to increase the output of low and high-speed screw extruders. It has been shown that differing screw configurations have only a limited influence, but that the output can be significantly increased if the receptive capacity of the screw extruder is increased.

It is therefore an object of the present invention to increase the receptive capacity of a screw extruder in order to increase its output capacity.

To this end the present invention provides a screw extruder for synthetic plastics material comprising a body defining a bore, a filling aperture leading into the bore, and a screw mounted for rotation in the bore, the cross sectional area of the bore adjacent the filling aperture being of larger cross sectional area than that of the remainder, whereby the output of the extruder can be increased. Surprisingly, the enlargement of the interior of the filling section resulted in a significant increase in the output over the output of the known screw extruder having otherwise the same design.

It has been shown to be advantageous that a constantly narrowing transition is provided from the extension in the filling section to the remainder of the housing, said transition subjecting the synthetic plastics material granulate passing from the filling section to the remainder of the housing to preliminary compression as the space becomes radially narrower. This results in a significant increase in the output.

An additional significant increase in the output capacity of the extruder may be obtained by providing at least one rib in the filling section, said rib having a component parallel to the axis of the housing, extending longitudinally beyond the filling section and having a height which is not greater than the radial dimensions of the extension.

Additional advantageous features can be seen from the claims, the specification and the drawings, in which a screw extruder for plastics is illustrated schematically as an embodiment of the invention. In the drawings:

Figure 1:
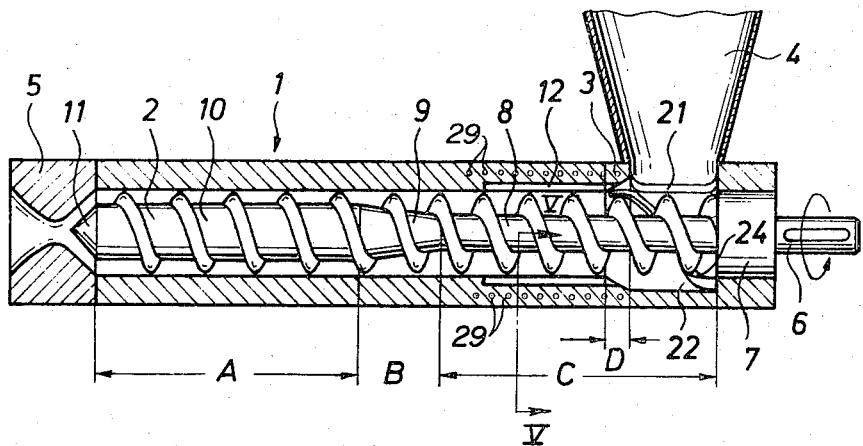
FIG. 1 shows a longitudinal section of the screw extruder.
Figure 5:
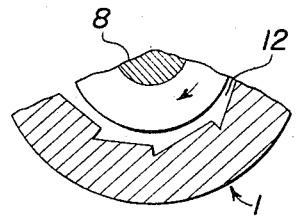
FIG. 5 is an enlarged partial section of FIG. 1 showing the cross section of a groove 12.

Referring to the drawings the screw extruder for plastics has a housing 1 and a screw 2. The housing 1 has a filling section 3 attached removably thereto on which a hopper 4 is placed. An extruder die 5 is attached to the housing 1 on the side remote away from the hopper 4.

The screw 2 has a drive journal 6, a seal 7, a feed section 8, a compression section 9, a homogenizing and metering section 10 and a conical tip 11, which extends into the extruder die 5. The diameter of the seal 7 corresponds to the inside diameter of the adjacent section of the housing 1. The screw extends from sections 8 to 10, having its smallest diameter in the feed section 8 and its largest in the metering section 10, with a tapered transition in the compression section 9.

Section A of the screw extruder comprises the metering section 10 of the screw, section B its compression section 9 and section C its feed section 8. Sections A, B and C are designated the homogenizing metering zone, compression zone and inlet or feed zone respectively.

Figure 4:
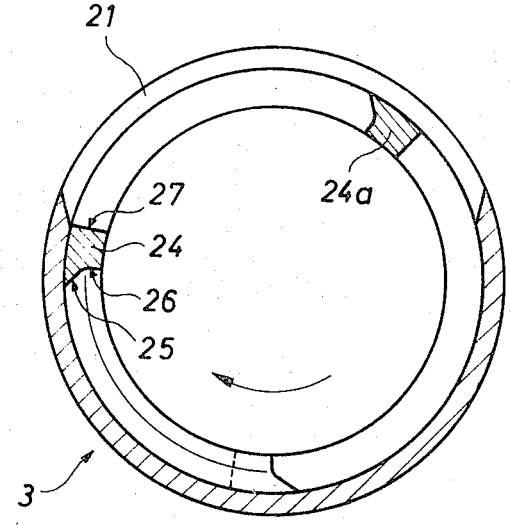
FIG. 4 shows a section along line IV—IV in FIG. 2.
Figure 2:
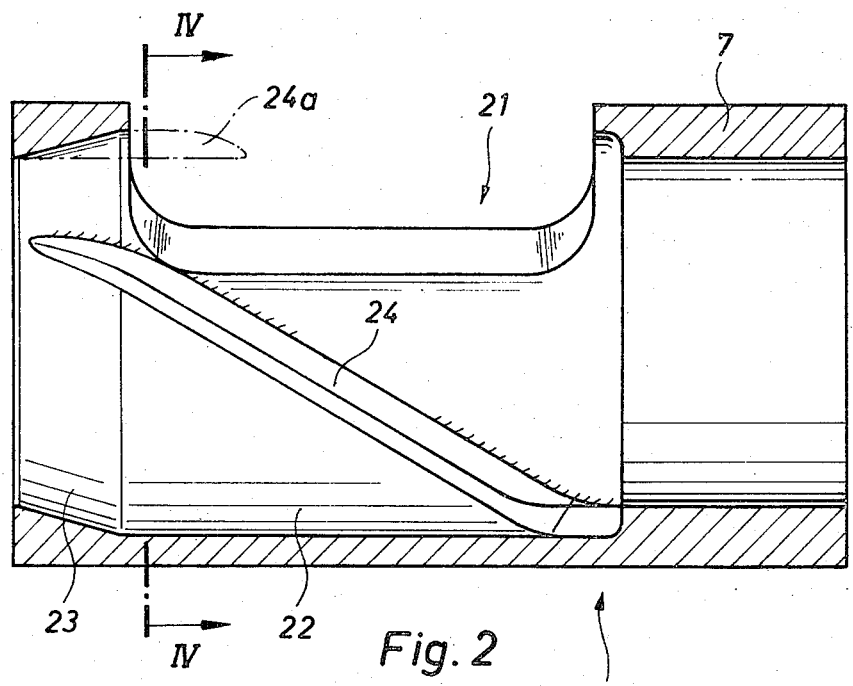
FIG. 2 shows the filling section illustrated in the longitudinal section on a larger scale.
Figure 3:
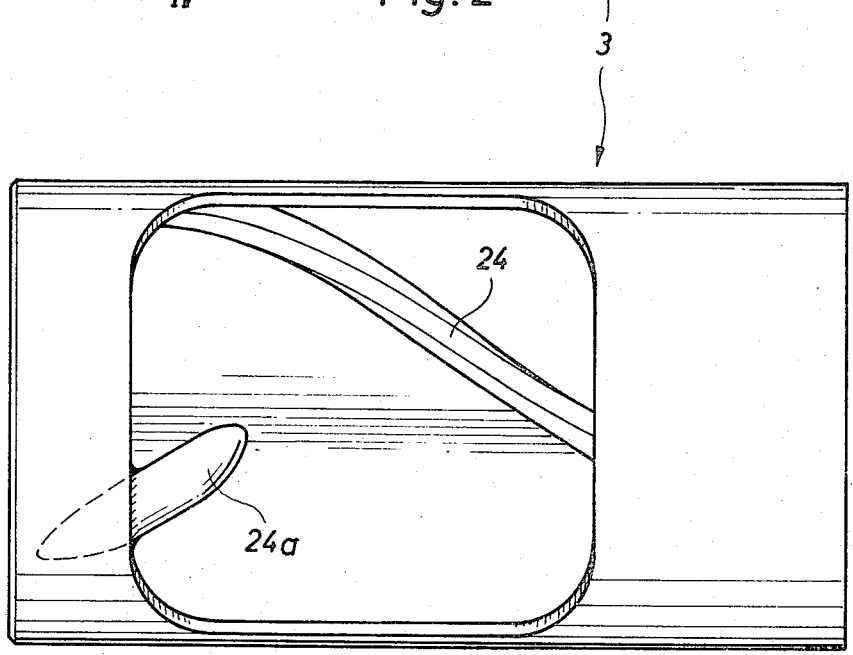
FIG. 3 shows a plan view of the filling section shown in FIG. 2

The filling section 3 illustrated in FIGS. 2 to 4 has a filling opening 21 of substantially rectangular cross section connected to the hopper 4. The length of the filling opening 21 is approximately 1.5 to twice the outside diameter of the screw. In the vicinity of the extension 22, it has a greater inside diameter than the remainder of the housing 1 and the seal 7. If the diameter of the seal is 45 or 60 mm (1.77 or 2.36 in), the extension has a diameter of 55 or 70 mm respectively (2.17 or 2.76 in). The radial height of the extension is generally selected so as to represent approximately twice the diameter of a granule. The granules can roll around in the extension 22 while the screw is in operation to assume favourable positions for being tightly compressed. The length of the extension 22 is equal to or slightly greater than the length of the filling opening 21.

On the side remote from the seal, the extension 22 and the filling opening 21 are followed by a tapered transition zone 23 having an angle of 30°, for example. The corresponding zone D of the screw can be designated a pre-compression zone. On the inside of the housing 1 from the filling section 3 to about the start of the homogenizing or metering section 10 of the screw 2 are mounted longitudinal grooves 12, which oppose a rotary movement of the plastics granulate advanced by the screw 2. The cross section of the longitudinal grooves 12, which are 4 to 12 mm (0.16 to 0.47 in), in particular 5 to 10 mm (0.20 to 0.39 in), deep, depending on the nature of the plastics to be processed and the size of the screw, is triangular, with one side of the triangle extending radially. The angle, remote from the screw 2 and formed by the walls of the longitudinal grooves 12, is approximately 60°. The radial walls of the longitudinal grooves are arranged in such a manner relative to the direction of rotation of the screw 2 that the plastic advanced by the screw 2 is pressed against these walls. The longitudinal grooves 12 extend to a point approximately one screw channel in front of compression zone B.

Located on the inside of the filling section 3 in the vicinity of the extension 22 is a rib 24, which extends inward radially to the inside diameter of the seal 7. The radial extension or height of the rib, however, can also be somewhat smaller. The output of the screw 1 depends on the height of the rib 24, so that with differing heights of the ribs, differing outputs can be achieved with otherwise unchanged conditions. Thus, the output of a screw extruder can be altered by either changing the rib 24 or changing the filling section 3 for one with a rib of a differing height.

The rib 24 can extend parallel to the longitudinal axis of the housing 1, but is preferably arranged at an angle to a line parallel to the longitudinal axis, an acute angle of 30° having been shown to be favourable. The rib 24 preferably extends the entire length of the extension 22 and the transition 23, where it ceases. As can be seen from FIG. 4, the rib, as viewed in the direction of rotation of the screw 2, has on its front side a bevelled contact surface 25 which is followed by a face 26 extending radially and on its rear side a face 27 extending radially. The rib 24 extends from the seal 7 to the transition 23 and its angular extent between these two points is approximately a quarter circle. It is located in such a manner that the end disposed in the area of the transition 23 is tangential to the filling opening 21 (FIG. 4). Displaced 180° relative to the rib 24 is a further rib 24a, having the same pitch as the rib 24 and extending into the filling opening 21. The design of the inner surface of this rib 24a corresponds to the rib 24 and the outside is rounded. The rib 24 and the rib 24a oppose a rotary movement of the plastic granulate in the extension 22.

The rib 24 and the rib 24a are welded to the filling section 3, but can also be attached differently, for example, interchangeably. In the area of the extension 22, both ribs extend like a helix.

The extension 22 and the rib 24 and/or 24a can be mounted on low and high-speed screws and are intended particularly for high-speed screws. A high-speed screw with an inside housing diameter of 60 mm (2.36in) and a screw length of approximately ten times the inside diameter of the housing would provide an output of approximately 130 kg (287 lbs) per hour using the prior-art casing which does not have the extension 22 and the rib 24 and/or 24a, while if a casing designed according to the invention were employed, the output would be increased to approximately 360 kg (794 lbs) per hour, with the design otherwise the same. The rotary speed of the screw was 500 rpm in both cases. With a filling section 3 having both the transition 23, with the extension 22 and the rib 24 in the extension 22 approximately 50 percent of the increase in output results from each of these measures. The extension 22 alone also results in an increase in the output over a screw extruder of the same type not having this extension in its filling section.

An enclosed channel 29 arranged in a spiral manner can be provided in the screw housing for cooling, the channel extending over the area of the longitudinal grooves 12 is somewhat beyond it. The coils of the spiral of the cooling channel can be located relatively close to one another. The cooling prevents the granulate located in the longitudinal grooves from plasticizing prematurely and rotating relative to the housing 1. As long as the pre-compressed granulate is carried in the longitudinal grooves, its relation to the screw 2 is the same as a nut screwed on a thread which is held on its outside as the thread rotates.

Obviously, many modifications and variations of the present invention are possible in the light of the above teachings. It should therefore be understood that within the scope of the appended claims, the invention may be practised otherwise than as specifically described.

What is claimed is:

1. A screw extruder for plastic comprising
a stationary housing having an interior wall defining an axially extending bore, and
a screw within said housing
said screw and housing having a filling zone, a compression zone and an homogenizing zone;
said housing having a filler opening in said filling zone, the inner diameter of said bore being greater along the axial dimension of said filler opening than in the remainder of said bore;
the interior wall of said housing defining a substantially continuous conical taper from said greater inner diameter to the adjacent portion of said bore; and
an inwardly protruding, generally axially extending rib fixedly attached to the inner wall of said housing at the location of said greater inner diameter, said rib extending into and terminating at said taper,
the inner radial limits of said rib being defined by the inner radius of said compression and homogenizing zones.

2. A screw extruder according to claim 1 wherein the interior wall of said housing further defines a plurality of longitudinal grooves extending from said taper away from said filler opening.

3. A screw extruder according to claim 1 wherein a portion of said rib extends across the interior of said filler opening.

4. A screw extruder according to claim 1 wherein said rib extends in the shape of a helix.

5. A screw extruder according to claim 1, wherein said housing includes cooling channels located in the region extending from the filler opening to the compression zone.

6. A screw extruder according to claim 1 wherein said longitudinal grooves are triangular in cross section, one side of the triangle extending in a radial direction.

7. A screw extruder according to claim 1 wherein the cross-sectional shape of said rib includes an elongated radially extending surface facing opposite the direction of motion of the screw, and a sloping surface joining said radially extending surface and the interior wall of said housing.

8. A screw extruder according to claim 7 wherein said rib further includes a second radially extending surface on the side opposite said elongated radially extending surface.

* * * * *